United States Patent
Laitinen-Vellonen

(10) Patent No.: US 6,792,388 B2
(45) Date of Patent: Sep. 14, 2004

(54) METHOD AND SYSTEM FOR MONITORING AND ANALYZING A PAPER MANUFACTURING PROCESS

(75) Inventor: Sakari Laitinen-Vellonen, Jyväskylä (FI)

(73) Assignee: Liqum Oy, Jyvaskyla (FI)

(*) Notice: Subject to any disclaimer, the term of this patent is extended or adjusted under 35 U.S.C. 154(b) by 143 days.

(21) Appl. No.: 10/240,688
(22) PCT Filed: Apr. 4, 2001
(86) PCT No.: PCT/FI01/00324
§ 371 (c)(1), (2), (4) Date: Oct. 2, 2002
(87) PCT Pub. No.: WO01/75222
PCT Pub. Date: Oct. 11, 2001

(65) Prior Publication Data
US 2003/0139904 A1 Jul. 24, 2003

Related U.S. Application Data
(60) Provisional application No. 60/241,919, filed on Oct. 20, 2000.

(30) Foreign Application Priority Data
Apr. 5, 2000 (FI) ............ 20000796

(51) Int. Cl.⁷ ............ G06F 15/00; D21F 11/00
(52) U.S. Cl. ............ 702/182; 162/198; 703/7; 702/183
(58) Field of Search ............ 702/81–84, 127, 702/182; 162/49, 198, 263; 703/7; 700/29, 44; 706/25, 31

(56) References Cited

U.S. PATENT DOCUMENTS

| 5,347,446 A | 9/1994 | Iino et al. ............ 700/29 |
| 5,671,335 A | 9/1997 | Davis et al. ............ 706/25 |
| 5,960,381 A | 9/1999 | Singers et al. ............ 702/183 |
| 6,187,145 B1 * | 2/2001 | Furumoto et al. ............ 162/198 |
| 6,208,953 B1 * | 3/2001 | Milek et al. ............ 703/7 |

FOREIGN PATENT DOCUMENTS

| EP | 0895197 | 2/1999 | ............ 703/7 |
| WO | 9629468 | 9/1996 | ............ 162/198 |

* cited by examiner

Primary Examiner—John E. Barlow
Assistant Examiner—John Le
(74) Attorney, Agent, or Firm—Fildes & Outland, P.C.

(57) ABSTRACT

A method for monitoring and analyzing a paper manufacturing process, is disclosed in which a large number of quantities ($x_i$, t) are measured from the process, the measured quantities ($x_i$, t) are entered as an input vector ($\bar{X}$, t) into a neural network, which, in response to the input vector, produces an output vector ($\bar{Y}$, t) as a continuous quantity, at least one fingerprint consistent with a good process situation in regard of runnability, i.e. an optimal output vector ($\bar{Y}_o$, t) is determined and stored in memory, the stored fingerprints and fingerprints or output vectors obtained in a normal process situation are compared substantially in real time, and based on the comparison, a difference to be presented in a graphic form to the user is determined. Accordingly, a continuous time-dependent scalar quantity k=k(t) to be presented as a result to the user is determined as a geometric distance between the instantaneous measured fingerprint ($\bar{Y}$, t) and the taught fingerprint ($\bar{Y}_o$), and the scalar quantity k=k(t) is displayed via a display device to the user.

9 Claims, 2 Drawing Sheets

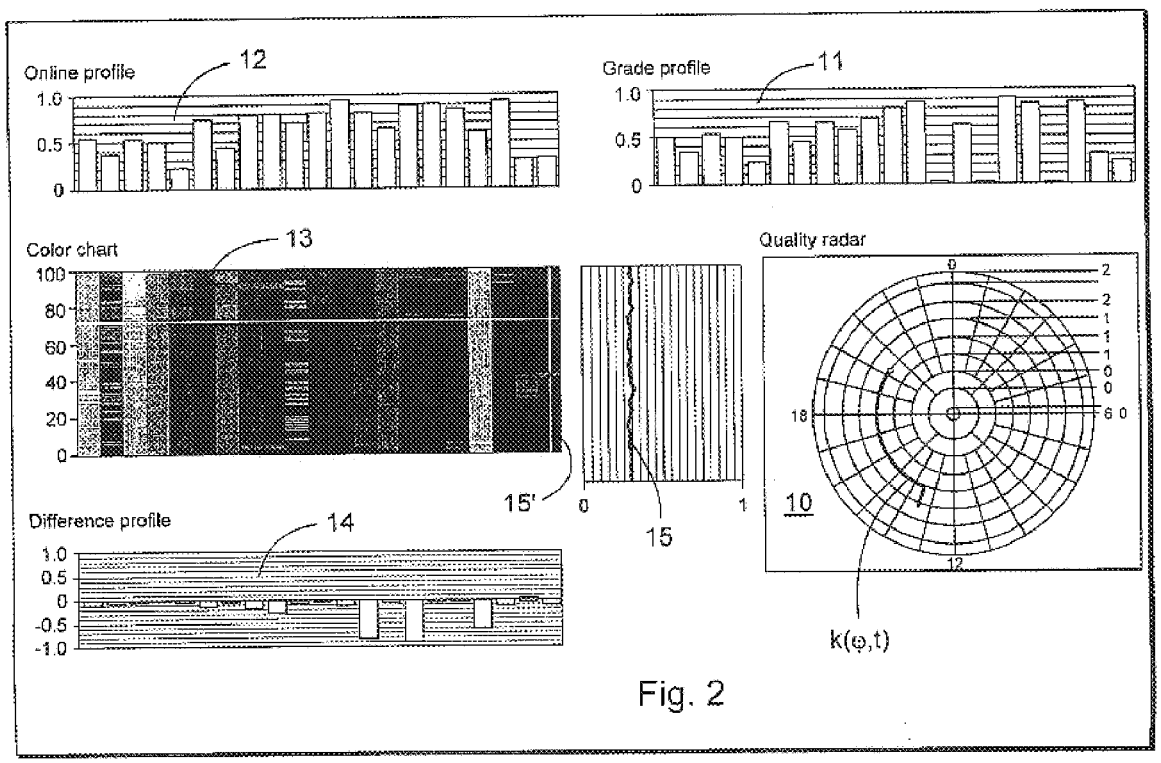

METHOD AND SYSTEM FOR MONITORING AND ANALYZING A PAPER MANUFACTURING PROCESS

Figure 1:
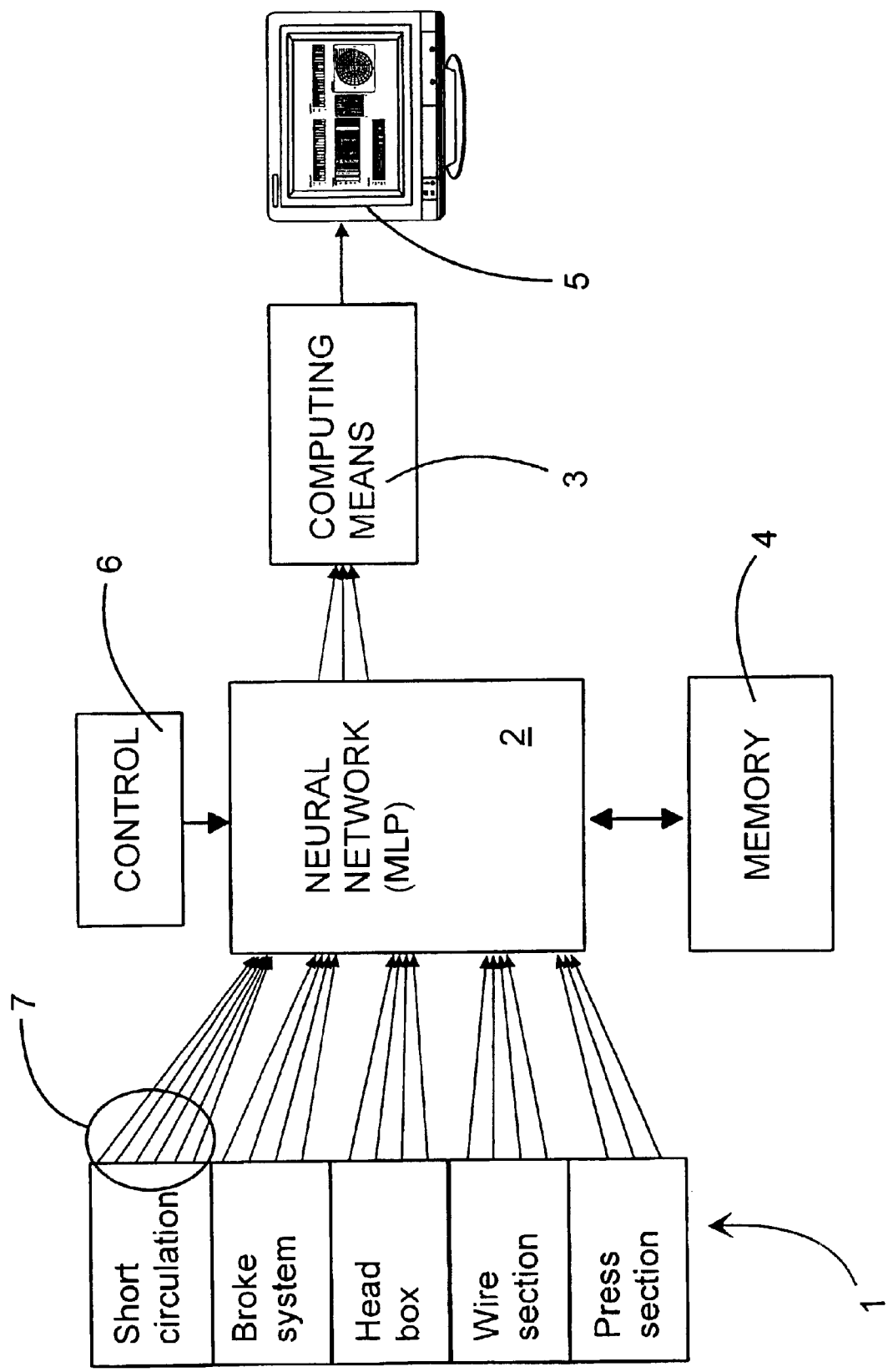

This application claims the benefit of provisional application Ser. No. 60/241,919 filed Oct. 20, 2000.

DEFINITION OF THE NATURE OF THE INVENTION

The invention concerns a method and system for monitoring and analyzing a paper manufacturing process, in which method a large number of quantities are measured from the process and entered as an input vector into a neural network which produces an output vector as a continuous quantity, and in which method at least one fingerprint representing a good process situation, i.e. an optimal output vector is defined, and fingerprints or output vectors obtained in a normal process situation are compared to the said optimal finger-print(s) or output vector(s) substantially in real time and, based on this comparison, the difference is determined and presented to the user in a graphic form.

BACKGROUND OF THE INVENTION

Using teachable neural networks, large amounts of data can be effectively classified and links or groupings present in measurements and large masses of data can be revealed that are very difficult to detect via statistical calculation, mathematical models and logical rules. The learning ability makes it possible to perform various functions with a reasonable accuracy by the aid of examples without detailed programming of all different situations and exceptions.

A neural network consists of simple computing elements, neurons, having a plurality of inputs and one response. A neural network is created by linking neurons to each other. The overall operation of the network is a combination of several weighted values which is difficult to understand via individual weights. The weights in the neural network are generally determined by teaching using examples. There are a fairly large number of different network structures and teaching algorithms.

Diversified descriptions of the principles and applications of neural networks are to be found in the publications "Neurolaskennan mahdollisuudet"; Pasi Koikkalainen, Tekes 1994, and "Neural Computing Theory and Practise"; Philip D. Wassermann, New York 1989, ISBN 0-442-20743-2.

In a paper manufacturing process, the operator should be able to obtain concentrated information about how well the process is performing as compared with previously identified good situations. So far, the paper manufacturing process has been analyzed e.g. by the SOM (Self Oriented Map) technique. Quite often, history data for a large number of variables is available in the form of various curves, of which the operator can select desired ones to be presented on his display. Generally, detecting a significant change in the set of history values is impossible because such changes are lost in normal random variation. Therefore, a method is needed that allows the entire process situation to be analyzed using a neural network and divergent situations to be classified as early as possible to enable the operator to start searching for the cause that led to the situation.

Neural network solutions so far applied in the paper manufacturing industry have not produced satisfactory results. Analyzing the results is difficult for the user; especially the results obtained by the above-mentioned SOM method are unclear.

Finnish patent application 941058 (Taipale) presents a method for the treatment of especially a paper manufacturing process. According to this application, a set of measurement results from the process is fed into a neural network, e.g. a perceptron network, and, using a special algorithm, adjustable variables are corrected in order to correct the operating point of the process. The method aims at directly optimizing the quality of the final product, which is determined via 100–300 measurements for each machine roll.

European patent 815320 (Furumoto) discloses a method for process control of a paper machine by utilizing a neural network. A set of measurements comprises spectral values of the substances used, and statements regarding the quality of the product are transmitted via the neural network and corresponding control signals are passed further to a so-called stock preparation stage. In this case, too, product quality is the primary control variable. Spectral (optical) measurements are ill suited for the determination of chemical changes.

U.S. Pat. No. 5,347,446 (Iino) presents a regulation system resembling the process and based on creating a model of the process. Computations produce a scalar cost function as a result. In practice, creating a model is probably only possible in the case of limited processes. It is not possible to create a model for the entire paper machine by this method.

In general, the experiences about control processes designed to control the entire paper machine are not encouraging. Among other things, incidental factors have a considerable effect on the process, which means that a rationally calculated correction in itself produces more changes and instability.

BRIEF DESCRIPTION OF THE INVENTION

The object of the present invention is to achieve a new type of method utilizing a neural network in a paper manufacturing process whereby the process can be more easily and accurately analyzed and monitored than before. The basic idea of the invention is only to monitor the process in a reliable manner especially in regard of its runnability. The task of monitoring the quality of the final product is entrusted to other measurement processes because a high quality of a good process situation is generally always achieved when the process situation itself is equally stable. The primary aim of the method of the invention is to describe the runnability of a paper machine. The instant of occurrence of a change in the fingerprints can be seen from history data, so it is possible to find out what changes have taken place in the output variables at this instant. Correcting a bad situation is outside the scope of the present invention, because correcting a given output variable is not a straightforward task as a given difference may be the result of many factors. Local know-how is preferably utilized. The personnel of each plant know their own plant, and this special knowledge is important when the process is to be corrected after it has got into an unstable condition.

The features characteristic of the method of the invention are presented in the claims below.

The output vector of the neural network is processed so as to produce a scalar or otherwise unambiguous quantity. The processing consists of applying a mathematical algorithm, and this can be done using a general-purpose computer.

According to a preferred embodiment, a polar conversion of a continuous difference quantity, expressing the state and history of the process in an extremely concentrated form, is presented to the user. According to a third embodiment, both the aforesaid polar conversion and sets of history values are presented side by side to the user, so that, when the process gets into an abnormal state, it will be easier to establish the reason for this. Even incidental causes of process instability can often be established by utilizing local know-how because the precise instant of occurrence of a change can be determined from history data. Preferably a multi-layer perceptron neural network is used.

The other advantages and embodiments of the invention will be described below in conjunction with examples of embodiments.

BRIEF DESCRIPTION OF ILLUSTRATIONS

In the following, the invention will be described in detail with reference to the attached drawings, wherein FIG. 1 presents a general arrangement for implementing the method of the invention, FIG. 2 presents a preferred user interface to a neural network, especially a presentation reducing the process data into a concentrated form.

DETAILED DESCRIPTION OF THE INVENTION

Typically, 20–30 variable quantities, consisting of various flow, temperature, consistency and pH values and data obtained from preferably electrochemical sensors, are measured from the manufacturing process. These variable quantities form an input vector $(\overline{X}, t)$ for a neural network, and an output vector $(\overline{Y}, t)$ is generated from them by means of the neural network. During the teaching phase, an optimal output vector $(\overline{Y}_0, t)$ has been established. The continuously measured output vector is compared to this optimal output vector, and the difference is produced in a graphic form clearly visible to the user. In practice, it has been found that this task can be best accomplished by using a multi-layer perceptron (MLP) neural network, and the difference to be presented in a graphic form is generated as a scalar quantity $k=k(t)$ expressing the geometric distance between the instantaneous measured fingerprint $(\overline{Y}, t)$ and the taught fingerprint $(\overline{Y}_0)$. The geometric distance is computed e.g. as a Euclidean distance.

$$k = \sqrt{\sum_n (y_i - y_{io})^2}$$

A polar conversion $k(\phi, t)$ is determined from the scalar quantity $k=k(t)$ according to the formula: $\phi(t)=t/T*2\pi$, where T is a selected trend $r(t)=k$.

The invention pertains to a paper machine environment as presented in FIG. 1. In most cases, a system according to the invention for use in conjunction with a paper machine 1 can be constructed using general-purpose computers provided with a display device 5 which are provided with an application implementing a neural network 2, computing means 3 and a memory 4. The system is connected to the paper machine 1 partly using existing measuring channels, partly via measuring sensors installed for this purpose. In this example, preferably a multi-channel electrochemical sensor 7 is connected to the short circulation of the paper machine. The control 6 and installation of the neural network 2 are preferably implemented using either the same or a separate computer. The broke system, headbox, wire section and press section are measured at least via the process data. Electrochemical measurements in at least some of these provide a substantial addition to the initial data. In the light of latest information, measurement of smell emitted by process liquids also looks promising. The electrochemical measurements include polarization, galvanostatic or only resting potential measurements.

The dimension of the output vector of the neural network is generally in the range of 3–15; in the examples in FIG. 1 and 2, it is 3 (with 21 input quantities). The minimum dimension is the number of categories to be distinguished.

FIG. 2 presents a preferred user interface to the neural network, in which a carefully selected set of data is displayed in a graphic form to the user. In this example, an array of bars 11, "Grade profile", in the upper right-hand part of the display represents a fingerprint consistent with a good process situation, i.e. dimensionless values of the measured quantities presented as bars. Correspondingly, displayed on the left is an array of bars 12, "Online profile", in which the instantaneously measured values are presented as dimensionless values and bars. Presented in the lower left-hand part of the display is a third array of bars 14, "Difference profile", showing the difference between each measured value and the corresponding optimal fingerprint value as a corresponding bar. The arrays of bars can naturally be presented as a continuous curve, although in both cases the same information is presented.

By observing the arrays of bars themselves, it is practically not possible to monitor the process because any changes that may occur are lost in random variation. Instead, the user is offered very concentrated information about the process situation via a graph 10, "Quality radar", in which a time-dependent difference quantity is presented as a polar conversion $k(\phi, t)$. As long as the dot representing the difference quantity obtained is circulating near the origin, the process is well under control. In an abnormal situation, the dot will move away from the origin. Changes in the difference quantity can be readily detected over a trend period whose length is selected e.g. so that it covers three working shifts.

In addition, the display presents a set of history values 13, "Color chart", showing bars which have been generated from the measured quantities $(x_i)$ over a period of time corresponding to a multiple of the trend, successive measurement values being displayed as a bar 13' of brightness/color information in which each value $(x_i, t_n)$ is shown as a transverse line of corresponding brightness/color. If the brightness/color of the bar remains unchanged, then its value has not varied, whereas confirmed changes are clearly visible as variations in bar color/brightness. Moreover, each bar in the set of history values can be presented as a separate curve 15 according to selection 15'.

In addition to the time-dependent scalar quantity $k=k(t)$, other parameters can naturally also be computed, although, on the other hand, any extra result information may be confusing to the user.

Since the runnability of the machine is influenced by the electrochemical surface charges which are present on different rollers, wires and felts and which, with time, further have an effect on the accumulation of dirt in the machine, the most advantageous alternative will probably be to measure the electrochemical values of the initial materials, especially those of the liquid flows in pulp production and process waters, as inputs to the neural network. The detection of smell of the waters will also be advantageous in this connection because certain changes, e.g. microbiological reactions produce a distinct smell trace before they can be discerned in the electrochemistry.

What is claimed is:

1. A method for monitoring and analyzing a paper manufacturing process, in which method a large number of quantities ($x_i$, t) are measured from the process, the measured quantities ($x_i$, t) are entered as an input vector ($\overline{X}$, t) into a neural network, which, in response to the input vector, produces an output vector ($\overline{Y}$, t) as a continuous quantity, at least one fingerprint consistent with a good process situation in regard of runnability, an optimal output vector ($\overline{Y}_o$, t) is determined and stored in memory, the stored fingerprints and the fingerprints or output vectors obtained in a normal process situation are compared substantially in real time, based on the comparison, a difference to be presented in a graphic form to the user is determined, characterized in that a continuous time-dependent quantity k=k(t) to be presented as a result to the user is determined as a geometric distance between the instantaneous measured fingerprint ($\overline{Y}$, t) and the taught fingerprint ($\overline{Y}_c$), and the aforesaid quantity k=k(t) for the period of a selected trend T is displayed via a display device to the user.

2. A method as defined in claim 1, characterized in that a multi-layer perceptron network (MLP) is selected as the neural network to be used.

3. A method as defined in claim 1, characterized in that a polar conversion k($\phi$, t) to be presented in a graphic form is generated from the said quantity k=k(t) as follows:

$\phi(t) = t/T * 2\pi$, where T is the selected trend $r(t) = k$.

4. A method as defined in claim 3, characterized in that a set of history values is determined from the measured quantities ($x_i$, $t_n$) over a period of time corresponding to a multiple of the trend, by periodically saving the dimensionless value ($y_i$, $t_n$) of each input quantity, which is stored and coded so as to produce brightness/color information, said values being displayed graphically in succession as a bar (13') in which each value ($y_i$, $t_n$) is visible as a transverse line or similar area of corresponding brightness/color.

5. A method as defined in claim 4, characterized in that both a graph of the polar conversion k($\phi$, t) and the history bars are presented to the user at the same time.

6. A method as defined in claim 3, characterized in that the information presented to the user on the same display additionally comprises the measured quantities and the good fingerprint as sets of values converted into a dimensionless and graphic form.

7. A method as defined in claim 1, characterized in that a set of difference quantities ($\overline{Y}_o - \overline{Y}$) together with a sequence of times is presented to the user in a graphic form.

8. A method as defined in claim 1, characterized in that the dimension of the output vector of the neural network is in the range of 3–10, preferably equaling the number of categories to be distinguished.

9. A system for monitoring and analyzing the paper production process in a paper machine, said system comprising:

a neural network having inputs for the entering of a large number of quantities ($x_i$, t) measured from the process and outputs for the delivery of a response, and computing means for the processing of the response, and storage means for the storage of a fingerprint consistent with a good process situation, an optimal output vector ($\overline{Y}_o$, t), means for comparing substantially in real time the stored fingerprints and the fingerprints or output vectors obtained in a normal process situation and for determining on the basis of the comparison a difference to be presented to the user, a display device for displaying the difference in a graphic form, characterized in that said neural network has been adapted to implement a multi-layer perceptron network (MLP), and the computing means have been adapted to determine from the output vector a continuous time-dependent scalar quantity k=k(t) as a geometric distance between the instantaneous measured fingerprint ($\overline{Y}$, t) and the taught fingerprint ($\overline{Y}_o$), and the display device has been adapted to display the said scalar quantity k=k(t).

* * * * *